B. W. WOLTERS.
DOUGH RAISER.
APPLICATION FILED AUG. 9, 1919.

1,333,525.   Patented Mar. 9, 1920.
2 SHEETS—SHEET 1.

WITNESS:
Edwin F. McKee

INVENTOR.
BY B. W. Wolters
Victor J. Evans
ATTORNEY.

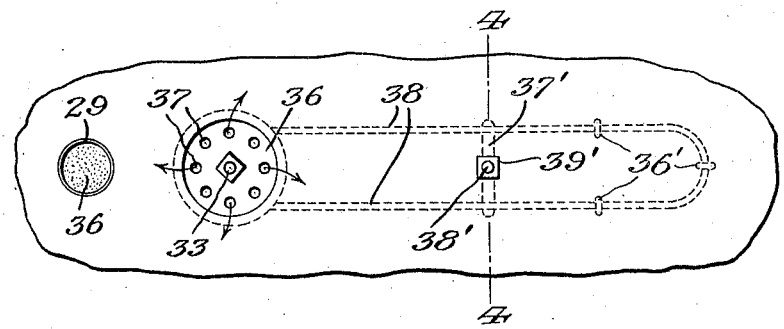
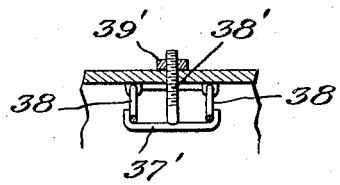
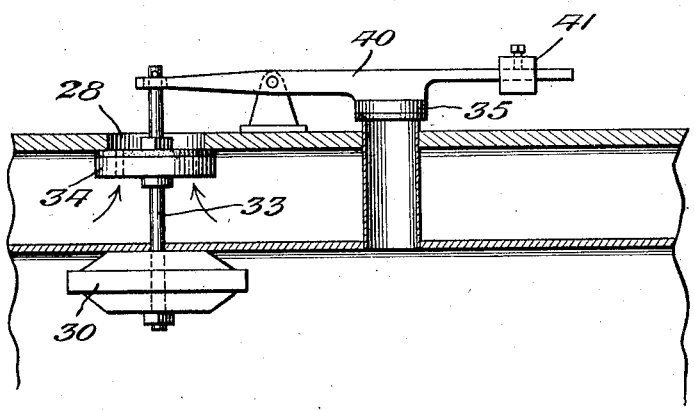

UNITED STATES PATENT OFFICE.

BENJAMIN W. WOLTERS, OF HOLLAND, MICHIGAN.

DOUGH-RAISER.

1,333,525.   Specification of Letters Patent.   Patented Mar. 9, 1920.

Application filed August 9, 1919. Serial No. 316,348.

*To all whom it may concern:*

Be it known that I, BENJAMIN W. WOLTERS, a citizen of the United States, residing at Holland, in the county of Ottawa and State of Michigan, have invented new and useful Improvements in Dough-Raisers, of which the following is a specification.

This invention relates to bread raising devices and it has particular reference to an automatic temperature regulating apparatus used in connection therewith.

Bread raising devices usually comprise an outer casing, an inner casing known as the oven arranged within the outer casing and spaced from the walls thereof and means for heating the air contained in the spaces between the outer and inner casings, suitable air inlets and outlets being provided.

One object of the invention is to produce a device of the class described in which communication is established not only between the air space between the outer and inner casings and the atmosphere, but also between the inner casing and the outer atmosphere together with means whereby the said means of communication will be automatically opened and closed as required.

A further object of the invention is to simplify and improve the construction of the means for controlling the outlet of heated air.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however understood that no limitation is necessarily made to the precise structural details therein exhibited, but that changes, alterations and modifications within the scope of the claims may be resorted to when desired.

In the drawings:—

Fig. 3 is a fragmentary top plan view.

Fig. 4 is a sectional detail view taken on line 4—4 of Fig. 3.

Fig. 5 is a vertical sectional view showing a modified construction of the temperature controlling device.

Corresponding parts in the several figures are denoted by like characters of reference.

Figure 1:
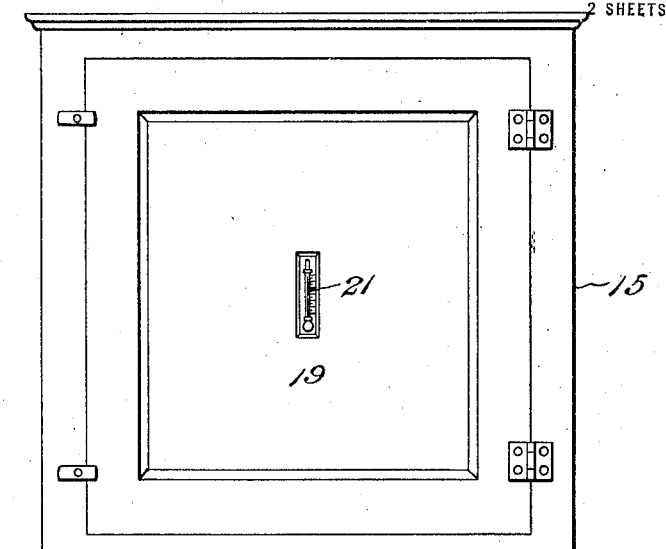
Figure 1 is a view in front elevation of a cabinet constructed in accordance with the invention.

In the several figures of the drawings 15 designates the outer casing or cabinet of the improved device, the same being preferably provided with feet or supports 16. 17 designates the inner casing or oven which is supported in any convenient well known manner within the outer casing, said oven being spaced from the side walls as well as from the top and bottom of the outer casing to provide an air space 18. The outer casing is provided with a door 19 which obviously must be so constructed that it will also afford a closure for the oven through which access may be had to the interior thereof, said oven being provided with shelves 20 which are preferably of portable nature so that they may be arranged in the most convenient manner. The door 19 carries a thermometer 21 arranged to indicate the temperature of the interior of the oven.

The bottom of the cabinet 15 has an air inlet 22 below which is supported a casing 23 in which a lamp 24 is placed for the purpose of heating the air entering and within the space 18. The casing 25 has a door 26, which is provided with air inlet apertures 27. The bottom of the oven is provided directly above the air inlet 22 with a protector 25' made preferably of heat nonconductive material such as asbestos or the like to prevent overheating by direct impact of the lamp flame. A deflector 27' is also provided whereby the air entering through the inlet and heated by the lamp will be deflected to the two sides of the structure, thereby equalizing the heat.

The top of the casing has a ventilating opening 28 which establishes communication between the outer atmosphere and the air space 18. A ventilating tube or duct 29 which connects the top of the outer casing with the top of the oven serves to establish communication between the outer atmosphere and the interior of the oven.

Figure 2:
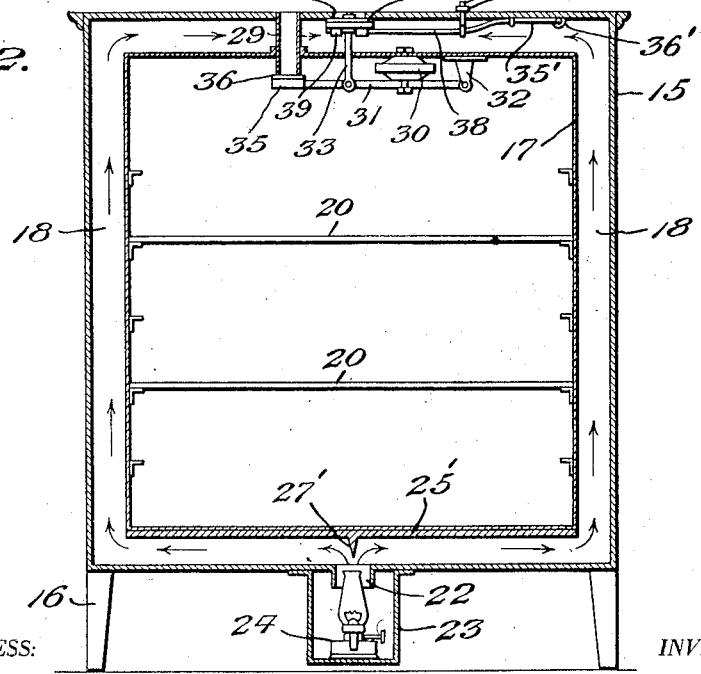
Fig. 2 is a vertical sectional view of the same.

Referring now particularly to Figs. 2, 3 and 4 of the drawings, 30 designates a thermostat device or wafer which may be be of any suitable well known construction and which is supported on the under face of the top of the oven. The wafer 30 serves to actuate the lever 31 which is fulcrumed on a bracket 32 a short distance from the wafer, said lever extending beneath the wafer with which it may be connected in any convenient manner.

Suitably connected with the lever 31 is a rod 33 to which vertical movement is imparted by the movement of the lever caused by the expansion and contraction of the thermostat wafer due to the variation of heat within the casing. The rod 33 carries near its upper end a valve 34 whereby the opening 28 will be obstructed until the heat within the casing rises above a predetermined degree. Connected with the lever 31 near the outer end thereof is a valve 35 whereby the lower end of the tube or duct 29 will be likewise obstructed as long as the heat within the casing is below a predetermined degree. The valves 34 and 35 may be provided with pads 36 of felt or other suitable material whereby a tight closure will be provided. The valve 34 has also been shown as being provided with openings or bleed holes 37 which will enable small quantities of the heated air carrying the products of combustion of the lamp 24 to escape to the outer atmosphere. A spring 38 secured on the under face of the top of the outer casing is arranged to press upward on the valve 34 thereby assisting in maintaining said valve as well as the valve 35 in closed or obstructing positions and also assisting in restoring the said valves to closed position after having been moved to open position by a rise of temperature within the casing, it being understood that both valves are connected with the lever 31 in such manner as to be carried thereby and actuated by the movement thereof. In the drawings a U-shaped spring 38 has been shown, the limbs of which extend through guides or keepers 39 on the valve 34. It will be seen that by this construction the entire thermostatic device or temperature regulating device is arranged within the casing or cabinet there being no part of the same to project above the top of the outer casing which latter, being unobstructed, may be readily kept free from dust and in a clean and sanitary condition. One end of the spring 38 is offset as at 35' to engage the under surface of the top of the casing to which it is secured by suitable fastening elements 36'. A cross piece 37' connects the spaced limbs of the spring, while a threaded element 38' rising from the said cross piece slides through an opening in the top of the casing. A nut 39' is associated with the threaded element, and obviously the adjustment of the nut provides for an adjustment of the spring 38 to vary the tension.

Referring now particularly to Fig. 5 of the drawings, it will be seen that the spring 38 has been omitted. The rod 33 is extended above the valve 34 and through the opening 28, the upper extremity of said rod being connected with one end of a lever 40 the other end of which carries a weight 41 which will tend to maintain the valve 34 as well as the valve 35 in engagement with the respective seats until lever 40 is actuated by the thermostatic device 30 to unseat the valves. The weight 41 is mounted adjustably on the lever 40 so as to present more or less resistance for the opening of the valves by the rise of temperature.

In each form of the invention it will readily be seen that when the heat within the casing is raised above a predetermined degree, the expansion of the thermostat element 30 will result in a movement of the levers 31 and 40 whereby the valves 34 and 35 will be moved to open position, thereby permitting the hot air to escape not only from the air space 18 but also from the space within the oven 17. As soon as the heat falls below a predetermined degree the valves will be automatically restored to closed position.

It will be understood that the thermostat element, designated by 30, may be of any suitable well known and approved construction which will adapt itself to the purposes of the invention. By this device the temperature may be easily and effectively regulated, not only in the air space between the outer casing and the oven, but also in the space within the oven on the shelves of which bread dough may be placed for raising. It is also obvious that the invention in its commercial form is not limited to bread raising, but is capable of being successfully applied to driers and many other devices.

Having thus described my invention what I claim as new is:—

1. An outer casing, an oven supported within the same and spaced therefrom to produce an intermediate air space, means for heating the air in said space, a ventilating opening in the outer casing, a ventilating duct connecting the outer casing with the oven and means for automatically and simultaneously regulating the passage of heated air through said opening and duct.

2. An outer casing, an oven supported within the same and spaced therefrom to produce an intermediate air space, means for heating the air in said space, a ventilating opening in the outer casing, a ventilating duct connecting the outer casing with the oven and means for automatically and simultaneously regulating the passage of heated air through said opening and duct, said means including a thermostatic device, a lever actuated thereby, and valves controlled by the movement of said lever.

3. An outer casing, an oven within said casing spaced therefrom to produce an intermediate air space, said outer casing having an air inlet, means for heating air passing through said inlet and within the air space by a ventilating opening in the top of the outer casing, a ventilating duct connecting the top of the outer casing with the top of the oven, a thermostatic device supported on the under face of the top of the oven, a lever actuated by the thermostatic device and valves connected with and controlled by said lever for automatically and simultaneously regulating the passage of heated air through the ventilating opening and duct.

4. An outer casing, an oven supported, in the same and spaced therefrom to provide an air space, means for heating the air in said space, a ventilating opening in the outer casing, a duct establishing communication between the inner casing and atmosphere, means for automatically and simultaneously regulating the passage of air through said opening and duct, said means including a thermostat device, a lever actuated thereby, valves controlled by said lever, a spring terminally connected with the outer casing and one of said valves for holding the lever in a position whereby said valves are closed, and means for adjusting said spring to vary its tension.

In testimony whereof I affix my signature.

BENJAMIN W. WOLTERS.